United States Patent [19]

Zoeller et al.

[11] Patent Number: 5,693,736
[45] Date of Patent: Dec. 2, 1997

[54] REACTIVE EMULSIFIERS BASED ON UNSATURATED POLYURETHANES

[75] Inventors: Joachim Zoeller, Mainz; Katja Thiergaertner, Nuremberg, both of Germany

[73] Assignee: Hoechst Aktiengesellschaft, Frankfurt am Main, Germany

[21] Appl. No.: 548,723

[22] Filed: Oct. 26, 1995

[30] Foreign Application Priority Data

Oct. 27, 1994 [DE] Germany .................. 44 38 430.0

[51] Int. Cl.[6] ................ C08J 3/00; C08K 3/20; C08L 75/00; C08G 18/00
[52] U.S. Cl. ............ 528/44; 524/507; 524/590; 524/591; 524/839; 528/60; 528/65; 528/66; 528/75; 528/76; 528/85
[58] Field of Search ................ 528/44, 60, 65, 528/66, 75, 76, 85; 524/507, 591, 590, 839, 840; 525/123, 455

[56] References Cited

U.S. PATENT DOCUMENTS

| | | | |
|---|---|---|---|
| 3,124,605 | 3/1964 | Wagner | 260/453 |
| 3,183,112 | 5/1965 | Gemassmer | 106/316 |
| 3,919,218 | 11/1975 | Schmitt et al. | 260/248 NS |
| 3,953,406 | 4/1976 | Marsh, Jr. | 260/77.5 |
| 4,070,323 | 1/1978 | Vanderhoff et al. | 260/29.6 |
| 4,324,879 | 4/1982 | Bock et al. | 528/45 |
| 4,689,357 | 8/1987 | Hongu et al. | 521/176 |
| 4,980,108 | 12/1990 | Suzuki et al. | 264/134 |
| 5,095,066 | 3/1992 | Meixner et al. | 524/500 |
| 5,189,133 | 2/1993 | Meixner et al. | 528/49 |

FOREIGN PATENT DOCUMENTS

| | | |
|---|---|---|
| 2035513 | 8/1991 | Canada . |
| 27 54 140 | 6/1979 | Germany . |

*Primary Examiner*—George F. Lesmes
*Assistant Examiner*—Patrick Niland
*Attorney, Agent, or Firm*—Foley & Lardner

[57] ABSTRACT

Polyurethanes which have olefinic double bonds and a content by mass of ethylene oxide units, incorporated via polyethylene glycol, of from 20 to 80% and which are obtainable by reacting (a) at least one organic polyisocyanate with (b) at least one polybutadiene derivative which is reactive toward isocyanates, and (c) if desired, one or more diols which contain, in addition, at least one further hydroxyl group or carboxyl group, and (d) a polyoxyalkylene glycol component having a molar mass of from 500 to 10,000 g/mol, wherein the ratio of NCO to OH equivalents, based on all the starting components (a) to (d), is from 0.5:1 to 1.2:1. The polyurethanes are useful, for example, as reactive emulsifiers.

8 Claims, No Drawings

REACTIVE EMULSIFIERS BASED ON UNSATURATED POLYURETHANES

BACKGROUND OF THE INVENTION

1. Field of the Invention

The invention relates to hydrophilically modified, olefinically unsaturated polyurethanes and to their use, for example, as reactive emulsifiers for synthetic resins which can be cured by a free-radical and/or oxidative mechanism, in the preparation of aqueous synthetic-resin dispersions.

The invention relates further to a water-dispersible mixture of synthetic resins which contain unsaturated groups, which mixture comprises such hydrophilic polyurethanes as an emulsifier component, and to coating compositions whose binders include such a mixture.

2. Description of Related Art

One possibility of obtaining water-dilutable synthetic-resin dispersions is to use external emulsifiers. Thus, according to U.S. Pat. No. 4,070,323, for example, acryloyl-group-carrying polyurethanes are dispersed in water with the aid of anionic or cationic oil-in-water emulsifiers, for example, sodium lauryl sulfate. These emulsifiers are not incorporated into the paint film during free-radical crosslinking. The degree of water resistance which can be achieved in the paint films is, consequently, reduced to a significant extent.

DE-A 39 00 257 describes nonionic, hydrophilic (meth) acryloyl-group-containing polyurethanes and their use as reactive emulsifiers for nonwater-dispersible urethane (meth)acrylates. However, these emulsifiers only allow emulsification of a limited number of synthetic resins; they are not capable, for example, of emulsifying styrene-free, unsaturated polyester resins.

DE-A 40 04 651 describes air-drying polyurethane resins which contain both polyols and monoalcohols containing unsaturated groups, into which conventional alkyd resins can be emulsified in proportions of up to 40%.

EP-A 0 501 247 describes olefinically unsaturated polyurethanes, and their use as reactive emulsifiers, which contain a β,γ-ethylenically unsaturated ether alcohol component and which are employed principally as emulsifiers for unsaturated polyester resins.

A common feature of all of the above examples is that the number of double bonds in the unsaturated polyurethanes is comparatively low, as are—consequently—the possibilities for their reaction with the synthetic resin to be emulsified.

One possibility of introducing numerous double bonds into emulsifiers is described in DE-A 27 54 140. Since the hydrophilic component (exclusively polyethylene glycol) is linked to the hydrophobic component (polybutadiene) by an ester linkage, the emulsifier at the phase boundary is unstable with respect to hydrolysis. Consequently, the stability of the synthetic-resin emulsions on storage is inadequate.

SUMMARY OF THE INVENTION

An object of the present invention was therefore to develop emulsifiers capable of transferring a wide range of binders to the aqueous phase. These emulsifiers should be stable to hydrolysis and should carry as many as possible reactive groups which are able to react with the binder. Furthermore, there should be minimal or no adverse effect on the film properties in respect of gloss, water-resistance, and the like.

It is also an object of the invention to provide methods of making and using such emulsifiers, and to provide water dispersible mixtures including synthetic resins, and to provide aqueous coating compositions including such mixtures.

These objects have been achieved with the provision of the hydrophilic polyurethanes according to the invention, which are described in greater detail below, and with their use according to the invention, which is likewise described in more detail below.

In accordance with these objectives, the invention therefore provides polyurethanes which have a mass fraction of ethylene oxide units, incorporated via polyethylene glycol, of from 20 to 80% and which have been prepared by reacting (a) at least one organic polyisocyanate with (b) at least one polybutadiene derivative which is reactive toward isocyanates, and (c) if desired, one or more diols which contain, in addition, at least one further hydroxyl group or carboxyl group, and (d) a polyoxyalkylene glycol component having a molar mass of from 500 to 10,000 g/mol while observing a ratio of NCO to OH equivalents, based on all the starting components (a) to (d), of from 0.5:1 to 1.2:1.

In accordance with the objects of the invention, there are provided uses of these polyurethanes according to the invention as reactive emulsifiers for synthetic resins which are not water-dispersible and can be cured by a free-radical and/or an oxidative mechanism in the preparation of aqueous dispersions of such resins.

In accordance with preferred aspects of the invention, there is provided a water-dispersible mixture of synthetic resins which contain unsaturated groups and can be cured by a free-radical and/or an oxidative mechanism, the mixture including (A) from 50 to 95 parts by weight of at least one nonwater-dispersible synthetic resin which contains unsaturated groups and has a number-average molar mass Mn of from 500 to 10,000 g/mol, and (B) from 5 to 50 parts by weight of a polyurethane which acts as dispersant in water, wherein the compound used as component (B) comprises at least one polyurethane of the above-mentioned type according to the invention.

Also, in accordance with these objectives, the invention also relates to a coating composition comprising an aqueous binder which can be cured by a free-radical and/or oxidative mechanism, and, if desired, auxiliaries and additives which are conventional in paint technology, wherein the binder includes a mixture of the type mentioned above.

Further objects, features, and advantages of the invention will become apparent from the detailed description of preferred embodiments that follows.

DETAILED DESCRIPTION OF PREFERRED EMBODIMENTS

The polyurethanes according to the invention are reaction products of the starting components (a) to (d) mentioned above. The proportions of components are selected to give polyurethanes having the desired characteristics. The preparation of the polyurethanes preferably involves the use, per mole of component (a), of from 0.3 to 1 mol of component (b), from 0 to 0.5 mol of component (c) and from 0.3 to 1 mol of component (d). Particularly preferably employed are 0.35 to 0.95 mol of component (b), 0.09 to 0.45 mol of component (c) and 0.35 to 0.95 mole of component (d), each time relative to 1 mol of component (a).

Component (a) comprises at least one organic polyisocyanate. Suitable polyisocyanates are any organic polyisocyanates which are known per se from, for example, polyurethane chemistry. The polyisocyanates generally contain isocyanate groups bonded to aliphatic, cycloaliphatic and/or aromatic structures. The polyisocyanates preferably have a molar mass of from 168 to 1,000 g/mol, more preferably from 168 to 300 g/mol. Examples of suitable polyisocyanates include 1,6-diisocyanatohexane (HDI), 1-isocyanato-3, 3,5-trimethyl-5-isocyanatomethylcyclohexane (IPDI), tetramethylxylylene diisocyanate (TMXDI), 4,4'-diisocyanatodicyclohexylmethane, 4,4'-diisocyanatodiphenylmethane, its technical-grade mixtures with 2,4'-diisocyanatodiphenylmethane and, if desired, with the higher homologs of these diisocyanates, and 2,4-diisocyanatotoluene and its technical-grade mixtures with 2,6-diisocyanatotoluene.

Diisocyanates of the type mentioned above by way of example are preferred as component (a), although polyisocyanates of higher functionality, such as, for example, biuret-, isocyanurate- or urethane-modified polyisocyanates based on the simple diisocyanates mentioned above are also suitable. These derivatives generally have a molar mass of up to 1000 g/mol. The preparation of such derivatives is described, for example, in U.S. Pat. Nos. 3,124,605; 3,183,112; 3,919,218; or 4,324,879.

The polybutadiene derivative (b) is polybutadiene or mixtures thereof which comprise functional groups reactive toward isocyanates. Any such polybutadienes can be used. The functional groups include, for example, hydroxyl, carboxyl, amino, and/or thiol groups, and can be inserted anywhere on the polybutadiene. The derivative includes mono- or polyfunctionalized polybutadienes such as, for example, monohydroxypolybutadiene, dihydroxypolybutadiene and polyhydroxypolybutadiene, carboxyl-functional polybutadienes, or OH— and/or amino-functional polybutadienes which are obtained by esterification and/or amidation of carboxybutadienes with diols or diamines.

As the higher-functional optional component (c), any such components having at least three functional groups, such as hydroxyl and/or carboxyl, can be used. This component preferably contains from 3 to 6 hydroxyl and/or carboxyl groups. Preference is given to trimethylolpropane, trimethylolethane, glycerol, ditrimethylolpropane, pentaerythritol and dipentaerythritol, and to bishydroxyalkanecarboxylic acids such as, for example, dimethylolpropionic acid or tartaric acid, with mixtures of two or more of these compounds also being useful.

As for component (d), any desired glycol component can be used. It preferably comprises linear polyoxyalkylene glycols having a number-average molar mass of from 750 to 20,000 g/mol, preferably from 1,000 to 10,000 g/mol. The molar content of oxyethylene units in these polyoxyalkylene glycols is generally at least 80%, preferably up to 100%.

"Mixed" polyoxyalkylene glycols are also useful. These may be formed, for example, by using mixtures of different alkylene oxides, for example, ethylene oxide and propylene oxide in a molar ratio of about 8:2, in the preparation of the polyoxyalkylene glycols by alkoxylation of suitable divalent starting molecules such as water, ethylene glycol or propylene glycol, for example. Component (d) preferably comprises, however, pure polyoxyethylene glycols. Polyethylene glycol monomethyl ethers are similarly useful in the synthesis of the emulsifiers. Also preferred are mixed poly(oxyethylene/oxypropylene) glycols with a mass fraction of more than 50% of oxyethylene moieties.

The preparation of the hydrophilic polyurethanes according to the invention comprises reaction of the above-mentioned starting components. This may be carried out in bulk or in solvents which are inert with respect to isocyanate groups, such as, for example, acetone, methyl ethyl ketone, N-methylpyrrolidone, ethyl acetate, butyl acetate, toluene, hydrocarbons, or mixtures of such solvents, at reaction temperatures which are preferably kept at from 20° to 200° C., in particular from 50° to 150° C.

The components may be reacted in any desired sequence. For example, components (b) to (d) can be reacted with component (a) either simultaneously or in stages.

Thus, in practice it is useful, for example, to employ a procedure in which components (b) to (d) form the initial charge and are reacted within the above-mentioned temperature ranges with the isocyanate (a) until the content by mass of NCO has fallen to below 0.1%. It is also possible to take component (a) as the initial charge, first add component (b) dropwise and then add the mixture of components (c) and (d), or first to add the mixture of (c) and (d) dropwise and then add, dropwise, component (b).

The nature and proportions of the starting components are chosen within the above-mentioned ranges so as to be sure of obtaining, based on components (a) to (d), a ratio of NCO to OH equivalents of from 0.5:1 to 1.2:1, preferably of from 0.7:1 to 1.1:1.

The reactions of urethane formation can be catalyzed in a manner known per se with various catalysts, for example, tin octoate, dibutyltin dilaurate, or tertiary amines. Also, the polyurethane can be protected against premature and unwanted polymerization or oxidation by addition of appropriate inhibitors and antioxidants in effective amounts of, for example, from 0.001 to 0.3% each, based on the overall mass of the mixture.

The hydrophilic polyurethanes obtained in this way, carry unsaturated groups, generally have a number-average molar mass of from 2 to 30 kg/mol, preferably from 3 to 20 kg/mol (gel permeation chromatography, polystyrene standard) and a content by mass of ethylene oxide units —$CH_2$—$CH_2$—O—, incorporated via polyethylene glycol, of from 20 to 80%, preferably from 30 to 70%.

The polyurethanes can be used in any application desired. It has been found that the hydrophilic polyurethanes are valuable emulsifiers for hydrophobic synthetic resins which are not dispersible in water. Any desired synthetic resin or mixtures can be emulsified with the polyurethanes of the invention. Generally, these synthetic resins normally have a number-average molar mass of from 0.5 to 20 kg/mol, preferably from 0.5 to 10 kg/mol (gel permeation chromatography, polystyrene standard).

These synthetic resins include any in the art and are preferably commercially available resins such as alkyd resins, UV binders, polyester resins, polyacrylates, polybutadiene oils, and polyepoxides. If desired, they can be slightly modified at a subsequent stage in order, for example, to increase their stability to hydrolysis.

The water-dispersible mixtures according to the invention comprise an amount of the inventive polyurethane to give the desired emulsification. Generally an amount from 50 to 95 or 96 parts by weight, preferably from 70 to 93 parts by weight, of the above-mentioned hydrophobic synthetic resin (s) (component A) is used as a mixture with from 4 or 5 to 50 parts by weight, preferably from 6 to 30 parts by weight, of the above-mentioned hydrophilic polyurethanes which are active as emulsifiers (component B). In a preferred embodiment, the nature and proportions of the individual components are selected such that the content by mass of the oxyethylene units derived from component (d) makes up from 2 to 20%, preferably from 5 to 17%, of the water-dispersed mixture.

It is also possible to use in the mixture further components which impart hydrophilicity, such as so-called coemulsifiers.

The mixtures can be prepared in any desired manner, for example, simply by mixing the individual components, if desired in the presence of the above-mentioned inert solvents.

In order to prepare the aqueous coating compositions according to the invention, the mixtures according to the invention are dispersed in water. The dispersion can be carried out either by simply stirring water into the initially charged mixture of the synthetic resin conventional dissolvers, or else by pouring the mixture into water with stirring. In this way, stable oil-in-water emulsions can be obtained.

These aqueous dispersions are valuable aqueous binders for coating compositions. They can be used, alone or in combination with the auxiliaries and additives known from paint technology, such as, for example, fillers, pigments, solvents and leveling assistants, for the production of coatings on substrates of all types.

Suitable substrates include paper, cardboard packaging, leather, wood, plastics, nonwovens, films and foils, textiles, ceramic materials, mineral materials, glass, metal, coated metal, artificial leather, and photographic materials such as, for example, paper provided with a photographic coating.

These coating compositions can be supplied in a known manner, for example, by spraying, knife-coating, rolling, brushing, dipping or pouring. After the water and any inert solvents which may have been used have evaporated, the coating may be crosslinked. The crosslinking of the coatings can be carried out either with the aid of high-energy radiation, such as UV light, electron beams or gamma rays, or by curing using metal salts of organic acids, (hydro) peroxides or other siccatives at temperatures between room temperature and 250° C.

In the case of crosslinking by UV irradiation it is often necessary to add photoinitiators to the coating compositions. Suitable photoinitiators include the compounds usually employed, as are described, for example, in Houben-Weyl, Methoden der organischen Chemie, Volume E 20, page 80 ff., Georg Thieme Verlag, Stuttgart, 1987. Highly suitable examples are benzoin ethers, such as benzoin isopropyl ether, benzil ketals, such as benzil dimethyl ketal, and hydroxyalkylphenones, such as 2-hydroxy-2-methyl-1-phenylpropan-1-one.

The photoinitiators mentioned are employed, depending on the intended application of the compositions according to the invention. Generally useful are proportions by mass of between 0.1 and 10%, preferably from 0.1 to 5%, based on the mass of the dispersed hydrophilic and hydrophobic synthetic resins. They can be used alone or else, owing to frequent advantageous synergistic effects, in combination with one another.

The metal salts employed in the case of oxidative crosslinking are, for example, cobalt salts, lead salts and manganese salts of siccative acids such as linseed oil fatty acids, tall oil fatty acids, soya oil fatty acids, of resin acids, such as abietic acid and naphthenic acid, or of acetic acid and isooctanoic acid. They are generally employed in quantities such that the content by mass of metal ions, based on the mass of the dispersed hydrophilic and hydrophobic synthetic resins, is from 0.005 to 1%. Examples of (hydro) peroxides which may be mentioned are: hydrogen peroxide, di-tert-butyl peroxide, benzoyl peroxide, cyclohexanone peroxide, methyl ethyl ketone peroxide, acetylacetone peroxide, dinonyl peroxide, bis(tert-butylcyclohexyl) peroxydicarbonate, tert-butyl hydroperoxide, cumene hydroperoxide, 2,5-dimethylhexane 2,5-hydroperoxide and diisopropylbenzene monohydroperoxide. These (hydro) peroxides are preferably employed in quantities of from 1 to 10% based on the mass of the dispersed hydrophilic and hydrophobic synthetic resins.

The polyurethanes according to the invention are also effective emulsifiers for oils based on oligomers and low molecular weight polymers of butadiene.

The invention is illustrated by the following examples. The examples are representative only and do not limit the scope of the invention. In the examples below, all percentages are to be understood as contents by mass.

EXAMPLES

Preparation of the Emulsifiers

Example E1

25.65 g of tetramethylxylylene diisocyanate (0.105 mol) are placed in a three-neck flask and heated under nitrogen to about 100° C. Then, with stirring, a mixture of 140 g of polybutadienediol (average molar mass 2800 g/mol) and 28 g of Solvesso® 100 (mixture of aromatic hydrocarbons with a low boiling range, TM of Exxon Chemical) is slowly added dropwise (about 30 min) to the diisocyanate. Stirring is continued at 100° C. until the NCO content has fallen to 2.2%.

The reaction mixture is then added slowly (about 30 min) with stirring to 600 g of polyethylene glycol 6000 (average molar mass 6000 g/mol) which has been heated to 100° C. Stirring is continued at 100° C. until free isocyanate can no longer be detected. After cooling, a pale yellowish, waxy emulsifier is obtained.

Example E2

25.65 g of tetramethylxylylene diisocyanate (0.105 mol) are placed in a three-neck flask and heated under nitrogen to about 100° C. Then, with stirring, a mixture 140 g of polybutadienediol (average molar mass 2800 g/mol) and 28 g of Solvesso® 100 are slowly added dropwise (about 30 min) to the diisocyanate. Stirring is continued at 100° C. until the NCO value has fallen to 2.2%. To the reaction mixture is then added slowly (about 30 min) with stirring 500 g of polyethylene glycol monomethyl ether 5000 (average molar mass 5000 g/mol) which has been heated. Stirring is continued at 100° C. until free isocyanate can no longer be detected. After cooling, a pale yellowish, waxy emulsifier is obtained.

Example E3

25.65 g of tetramethylxylylene diisocyanate (0.105 mol) are placed in a three-neck flask and heated under nitrogen to about 100° C. A mixture, heated to about 60° C., of 500 g of polyethylene glycol 10,000 (average molar mass 10,000 g/mol) and 100 g of Solvesso® 100 is then slowly added dropwise (about 30 min) with stirring to the diisocyanate. Stirring is continued at 100° C. until the NCO content has fallen to 0.67%. The reaction mixture is then added slowly (about 30 min) with stirring to 122 g of polybutadienediol (average molar mass 1220 g/mol) which has been heated to 100° C. Stirring is continued at 100° C. until free isocyanate can no longer be detected. After cooling, a pale yellowish, waxy emulsifier is obtained.

Example E4

400 g of polyethylene glycol 2000 (average molar mass 2000 g/mol) and 26.8 g of dimethylolpropionic acid (0.2 mol) are placed in a three-neck flask and heated under nitrogen to about 100° C. 128.25 g of tetramethylxylylene diisocyanate (0.525 mol) are then slowly added dropwise (about 30 min) to the mixture, with stirring. Stirring is continued at 100° C. until the NCO content has fallen to 1.5%. The reaction mixture is then slowly (about 30 min) added with stirring to 244 g of polybutadienediol 1220 (average molar mass 1220 g/mol) which has been heated to 100° C. Stirring is continued at 100° C. until free isocyanate can no longer be detected. After cooling, a pale yellowish, waxy emulsifier is obtained.

Example E5

900 g of polyethylene glycol 6000 (average molar mass 6000 g/mol) and 183 g of polybutadienediol (average molar mass 1220 g/mol) are placed in a three-neck flask and heated under nitrogen to about 100° C. 51.4 g of tetramethylxylylene diisocyanate (0.21 mol) and 200 g of Solvesso® 100 are then slowly added dropwise (about 30 min) to the mixture, with stirring. Stirring is continued at 100° C. until free isocyanate can no longer be detected. After cooling, a pale yellowish, waxy emulsifier is obtained.

Preparation of a Dispersion

Examples D1 to D6

In each case, 37 g of one of the emulsifiers described above are added to 200 g of a commercial alkyd resin (Alftalat® 650 100%) and the mixture is stirred at 70° C. for about 30 min until homogeneous. 1 ml of ammonia water (25%) is added, and then 345 g of deionized water heated to 70° C. are added dropwise very slowly (about 3 hours) with vigorous stirring. Milky pseudoplastic dispersions are obtained which are stable on storage for at least 9 months.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A polyurethane which has olefinic double bonds and a content by mass of ethylene oxide units, incorporated via polyethylene glycol, of from about 20 to 80%, which is obtained by reacting (a) at least one organic polyisocyanate, (b) at least one polybutadiene that is mono- or polyfunctionalized, wherein the functional groups are reactive toward isocyanates, said functional group being selected from the group consisting of hydroxyl, carboxyl, amino, and thiol groups, (d) a polyoxyalkylene glycol component having a number average molecular mass of from about 500 to 10,000 g/mol and including oxyethylene units;

while observing a ratio of NCO to OH equivalents, based on all the starting components (a), (b) and (d), of from about 0.5:1 to 1.2:1, with the proviso that said polyurethane does not contain, a diol which contains, in addition to the diol, at least one further hydroxyl group or carboxyl group.

2. A polyurethane as claimed in claim 1, wherein component (a) comprises one or more organic diioscyanate selected from the group consisting of aliphatic, aromatic, and cycloaliphatic diisocyanates.

3. A polyurethane as claimed in claim 1, wherein component (b) comprises at least one polybutadiene which has one or more functional end groups which is reactive toward isocyanates selected from the group consisting of hydroxyl, carboxyl, amino, and thiol groups.

4. A polyurethane as claimed in claim 1, wherein component (d) comprises one or more of polyethylene glycol or a poly(oxyethylene)(oxypropylene) glycol having a content by mass of more than about 50% of oxyethylene units.

5. A polyurethane as claimed in claim 1, wherein component (d) comprises at least about 80 mol % of oxyethylene units.

6. A polyurethane as claimed in claim 1, wherein component (b) comprises polybutadienediol.

7. A method of using a polyurethane as claimed in claim 1, as a reactive emulsifier for a synthetic resin which cannot be dispersed alone in water and which can be cured by a free-radical and/or oxidative mechanism, in the preparation of aqueous synthetic-resin dispersions, comprising adding the polyurethane in an emulsifying effective amount to the synthetic resin.

8. A polyurethane which is capable of being used as an emulsifier which has olefinic double bonds and a content by mass of ethylene oxide units, incorporated via polyethylene glycol, of from about 20 to 80%, which is obtained by reacting components consisting of:

(a) at least one organic polyisocyanate, (b) at least one polybutadiene that is mono- or polyfunctionalized, wherein the functional groups are reactive toward isocyanates, said functional group being selected from the group consisting of hydroxyl, carboxyl, amino, and thiol groups, and (d) a polyoxyalkylene glycol component having a number average molecular mass of from about 500 to 10,000 g/mol and including oxyethylene units;

while observing a ratio of NCO to OH equivalents, based on all the starting components (a), (b) and (d), of from about 0.5:1 to 1.2:1, and wherein the content by mass of NCO is less than 0.1%.

* * * * *